(12) United States Patent
Burns et al.

(10) Patent No.: US 9,172,773 B2
(45) Date of Patent: Oct. 27, 2015

(54) MANAGING TECHNOLOGY RESOURCES ACROSS MULTIPLE PLATFORMS

(71) Applicant: Microsoft Corporation, Redmond, WA (US)

(72) Inventors: Steven P. Burns, Redmond, WA (US); Todd J. Abel, Redmond, WA (US); Vadim Meleshuk, Seattle, WA (US); Weiqing Tu, Redmond, WA (US); Dov Sheinker, Ra'anana (IL); Amit Flashner, Ness-Zionna (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 302 days.

(21) Appl. No.: 13/721,042

(22) Filed: Dec. 20, 2012

(65) Prior Publication Data

US 2014/0181277 A1 Jun. 26, 2014

(51) Int. Cl.
*H04L 29/06* (2006.01)
*G06F 9/54* (2006.01)

(52) U.S. Cl.
CPC .............. *H04L 69/08* (2013.01); *G06F 9/541* (2013.01)

(58) Field of Classification Search
CPC . H04L 41/08; H04L 41/0803; H04L 41/0813; H04L 67/28; H04L 67/2823; H04L 69/08; G06F 9/541
USPC .......................... 709/203, 220, 221, 223, 246
See application file for complete search history.

(56) References Cited

U.S. PATENT DOCUMENTS

| | | | |
|---|---|---|---|
| 6,488,209 B1 | 12/2002 | Hunt et al. | |
| 7,013,331 B2* | 3/2006 | Das | 709/220 |
| 7,466,713 B2* | 12/2008 | Saito | 370/401 |
| 8,209,709 B2 | 6/2012 | Fleming | |
| 8,260,893 B1 | 9/2012 | Bandhole et al. | |
| 2003/0037129 A1* | 2/2003 | Beadles et al. | 709/220 |
| 2003/0054810 A1 | 3/2003 | Chen et al. | |
| 2004/0133704 A1* | 7/2004 | Krzyzanowski et al. | 709/250 |

(Continued)

OTHER PUBLICATIONS

Shenoy, Harish., "Key features and capabilities of IBM Worklight to accelerate your mobile development", Retrieved at <<http://www.ibm.com/developerworks/websphere/techjournal/1208_shenoy/1208_shenoy/pdf.pdf>>, Aug. 1, 2012, pp. 12.

(Continued)

*Primary Examiner* — Brian J Gillis
*Assistant Examiner* — Gil H. Lee
(74) *Attorney, Agent, or Firm* — Henry Gabryjelski; Kate Drakos; Micky Minhas (57) ABSTRACT

The present invention extends to methods, systems, and computer program products for managing technology resources across multiple platforms. Embodiments of the invention can be used to manage the configuration of a plurality of different devices. A management server/service can utilize native management capabilities of different devices to provide configuration management without requiring agents to be installed on the devices. In general, the management server/service adapts to the unique characteristics and behaviors of different devices, platforms, and external systems to provide configuration management for the different devices, platforms, and external systems. As such, configuration management can be provided in a unified fashion across different platforms, both on-premise and off-premise, and indirectly. When client agents are present, the management server/service can adjust to compatibly operate with the client agents.

20 Claims, 5 Drawing Sheets

(56) References Cited

U.S. PATENT DOCUMENTS

| | | | |
|---|---|---|---|
| 2005/0138317 A1* | 6/2005 | Cannon et al. | 711/170 |
| 2012/0096364 A1 | 4/2012 | Wilkinson et al. | |
| 2012/0096492 A1* | 4/2012 | Urban et al. | 725/39 |
| 2013/0290520 A1* | 10/2013 | Noo et al. | 709/224 |
| 2013/0339425 A1* | 12/2013 | Carion et al. | 709/203 |

OTHER PUBLICATIONS

Bradley, et al., "Mesmerize—an open framework for enterprise security management", Retrieved at <<http://citeseerx.ist.psu.edu/viewdoc/download?doi=10.1.1.2.6172&rep=rep1&type=pdf>> Proceedings of the second workshop on Australasian information security, Data Mining and Web Intelligence, and Software Internationalisation—vol. 32, Jan. 2004, pp. 6.

"FlexNet Manager Platform", Retrieved at <<http://www.flexerasoftware.com/products/core-software-asset-management.htm>> Jun. 26, 2012, pp. 2.

Thompson, Martin., "Inventory Software Review", Retrieved at <<http://www.itassetmanagement.net/wp-content/uploads/2012/01/InventoryDiscoveryNov11Final.pdf>> Nov. 2011, pp. 63.

* cited by examiner

MANAGING TECHNOLOGY RESOURCES ACROSS MULTIPLE PLATFORMS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

In enterprise network environments, an information technology (IT) management group typically manages the configuration of computing devices for an entity (e.g., a corporation). Larger networks can include 100's or even 1000's computing devices, including personal computers, phones, tablets, etc. Different computing devices can have different and unique technologies and implementation details, such as, different hardware and software. As a result, the required configuration management for the different computing devices can also vary.

Some computing devices may be more easily managed than other computing devices. For example, a widely adopted design for personal computer configuration management system is a client-server design. That is, a server (or service) is contacted by an accompanying client, which is typically a software process (an 'agent') running on the computer being managed. The client periodically contacts the server to receive configuration directives and to submit data regarding the management of the computer running the agent. The server and the client to be developed in tandem to increase interoperability.

On the other hand, when managing a mobile device (e.g., a slate/tablet/phone or similar), the client-server design often does not work. For example, on many mobile devices the device operating platform does not allow for an agent to be installed on the device. Alternatively, a device manufacturer, distributor, supplier, carrier, or licensing entity may not allow under the terms of the use of the device, the installation of an agent on the device (even if the operating platform does allow installation of an agent). For either of these configurations, it is typical for a device platform to already include some form of remote device management. That is, the device may already have some sort of management agent supplied by the device manufacturer. Additionally, the development of an agent for the device platform may be redundant with functionality already present on the device. Thus, even if the device lends itself to the installation of a management agent, it may not be attractive to develop one since doing so would provide little value over functionality already present.

Further, some configuration management directives are not realized on a device at all. Rather, such directives are to manage the configuration of other software systems on behalf of a user or device that utilizes those systems. For example, an IT admin may desire to manage a user's email in-box. However, the in-box is an artifact of the email system—separate from an IT configuration management system. That is, devices access the email system to retrieve the email for a given user. These devices, in the context of email retrieval, respond to the configuration of the email system. Nonetheless, the IT admin would like to specify management directives for the device's behavior that is governed by the email system. However, the email system is merely an intermediary for the indirect management of services.

Moreover, it is often the case that enterprises have existing and several systems in place that are installed "on premises," meaning, that the enterprise owns and operates the equipment on which those systems run. Likewise, it is increasingly the case that enterprises utilize services provided over communications networks such as the Internet. These Internet services are owned and operated by a third party. However, it can be difficult to manage these external systems using a client-server design.

It can also be difficult to manage a computing device when the client or server component in a client-server design changes. For example, it may be that a managed device has a native device client agent designed to work with a given IT management system. If the IT management system changes (e.g., due to an upgrade), the device client agent may become incompatible and require changes. In some environments, it may not even be possible to change the device client agent. For example, the device client agent may be embedded in hardware (e.g., an embedded system) and cannot be revised.

BRIEF SUMMARY

The present invention extends to methods, systems, and computer program products for managing technology resources across multiple platforms. In some embodiments, a directive dispatcher issues an abstract-device neutral directive to a specified (and possible one of many different) device(s). The abstract device-neutral directive directs the specified target device to implement a configuration change. A platform-specific gateway (possibly one of a plurality of different platform-specific gateways) for the specified target device receives the abstract device-neutral directive from a distribution component. The platform-specific gateway translates the abstract device-neutral directive into a form suitable for execution at the specified target device to implement the configuration change. The platform-specific gateway sends the form suitable for execution at the specified target device to the specified target device so as to realize the configuration change at the specified target device.

In other embodiments, a platform-specific gateway collects operational data from a specified target device. The operational data is in a device-specific data format and relates to a previously issued directive from a directive dispatcher. The platform-specific gateway translates the operational data from the device-specific data format into the device-neutral data format in accordance with a device-neutral data schema. The platform-specific gateway submits the operational data in the device-neutral data format to a data collection service for storage in a data persistence store. The operational data is available for subsequent use by business logic when processing issued directives from the directive dispatcher.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for managing technology resources across multiple platforms. In some embodiments, a directive dispatcher issues an abstract-device neutral directive to a specified (and possible one of many different) device(s). The abstract device-neutral directive directs the specified target device to implement a configuration change. A platform-specific gateway (possibly one of a plurality of different platform-specific gateways) for the specified target device receives the abstract device-neutral directive from a distribution component. The platform-specific gateway translates the abstract device-neutral directive into a form suitable for execution at the specified target device to implement the configuration change. The platform-specific gateway sends the form suitable for execution at the specified target device to the specified target device so as to realize the configuration change at the specified target device.

In other embodiments, a platform-specific gateway collects operational data from a specified target device. The operational data is in a device-specific data format and relates to a previously issued directive from a directive dispatcher. The platform-specific gateway translates the operational data from the device-specific data format into the device-neutral data format in accordance with a device-neutral data schema. The platform-specific gateway submits the operational data in the device-neutral data format to a data collection service for storage in a data persistence store. The operational data is available for subsequent use by business logic when processing issued directives from the directive dispatcher.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

Embodiments of the invention can be used to manage the configuration of a plurality of different devices. A management server/service can utilize native management capabilities of different devices to provide configuration management without requiring agents to be installed on the devices. In general, the management server/service adapts to the unique characteristics and behaviors of different devices, platforms, and external systems to provide configuration management for the different devices, platforms, and external systems. As such, configuration management can be provided in a unified fashion across different platforms, both on-premise and off-premise, and indirectly. When client agents are present, the management server/service can adjust to compatibly operate with the client agents.

A data model design models managed devices in a device-neutral manner. Service/server-side logic processes management directives in a device-neutral format. Gateway adaptors reconcile platform-specifics to management service generalisms. For example, gateway adaptors can translate device-neutral directives into device-specific directives. Gateway adaptors can also translate collected operational data from device-specific format into a device-neutral format for use by the service/server-side logic. Gateway adaptors can also adapt to various protocols used to communicate with devices.

As such, gateway adaptors can facilitate communication between endpoints that use different communication protocols.

Figure 1:
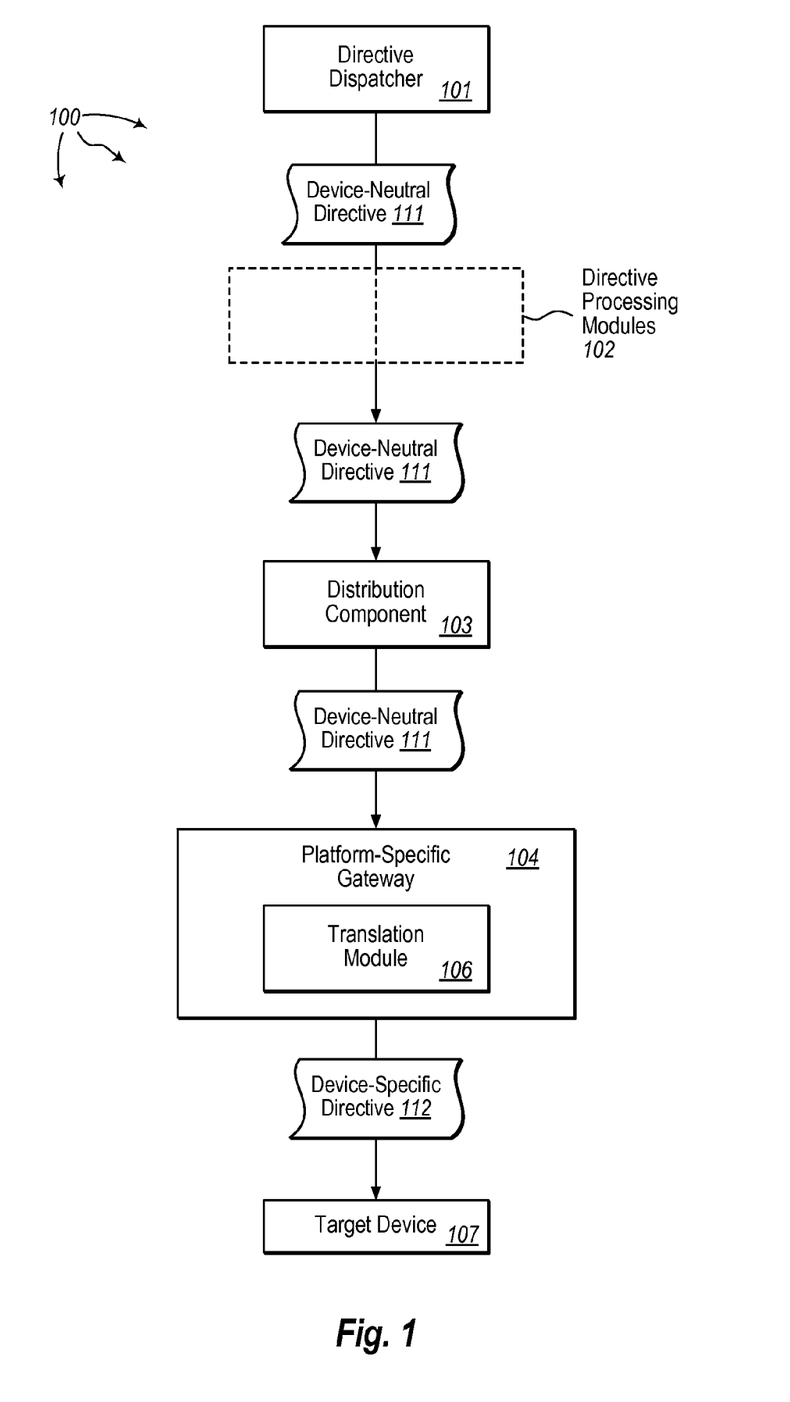
FIG. 1 illustrates an example computer architecture that facilitates translating a device-neutral directive.

FIG. 1 illustrates an example computer architecture 100 that facilitates translating a device-neutral directive. Referring to FIG. 1, computer architecture 100 includes directive dispatcher 101, directive processing modules 102, distribution component 103, platform-specific gateway 104, and target device 107. Each of directive dispatcher 101, directive processing modules 102, distribution component 103, platform-specific gateway 104, and target device 107 can be connected to one another over (or be part of) a network, such as, for example, a Local Area Network ("LAN"), a Wide Area Network ("WAN"), and even the Internet. Accordingly, directive dispatcher 101, directive processing modules 102, distribution component 103, platform-specific gateway 104, and target device 107 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

In general, directive dispatcher 101 is configured to issue device-neutral directives targeted to one or more specified target devices. The device-neutral directives can direct one or more specified target devices to implement a configuration change. When appropriate, directive processing modules 102 can process issued device-neutral directives to modify the device-neutral directives. Directive processing modules 102 can apply business logic to make changes for specified target device or to comply with policy settings. In some embodiments, directive processing modules 102 includes a plurality of modules that interact with one another to provide various features offered to a user (e.g., an IT admin).

Distribution component 103 is configured to distribute a device-neutral directive to one or more specified targeted devices. Distribution component 103 can receive a device-neutral directive. From the devices distribution component 103 is aware of, distribution component 103 can determine which devices are specified targeted devices of the device-neutral directive. Distribution component 103 can forward to the device-neutral directive on to the specified targeted gateways.

Platform-specific gateway 104 is configured to interface between more abstract device-neutral directives issued by directive dispatcher 101 and more concrete device-specific directives for target device 107 (and other similar devices). More specifically, translation module 106 can translate a device-neutral directive into a form suitable for execution at target device 107 (and other similar devices). In some embodiments, platform-specific gateway 104 is one of a plurality of different platform-specific gateways. Each of the plurality of different platform-specific gateways can be configured to interface between more abstract device-neutral directives issued by directive dispatcher 101 and more concrete device-specific directives for corresponding target devices. Each of the plurality of different platform-specific gateways can be configured for use with differently configured devices including any of the previously described devices. For example, platform-specific gateway 104 can be configured for use with mobile phones, another platform-specific gateway can be configured for use with personal computers, another platform-specific gateway can be configured for use with network equipment, etc.

Target device 107 can be one of a variety of different devices, such as, for example, a personal computer, a mobile phone, a tablet, network equipment, etc. or other previously described devices.

Figure 2:
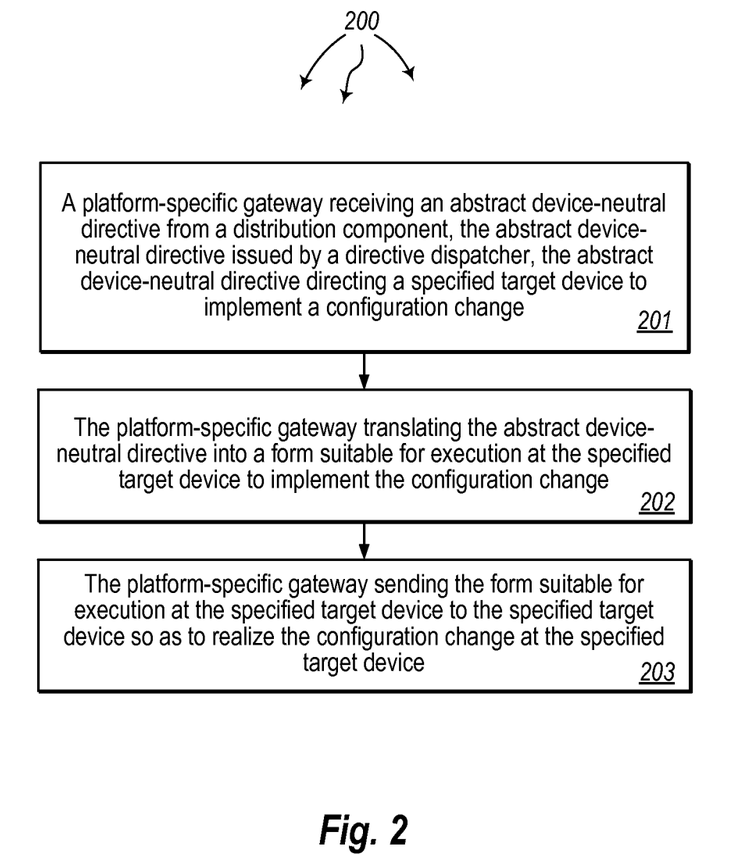
FIG. 2 illustrates a flow chart of an example method for translating a device-neutral directive.

FIG. 2 illustrates a flow chart of an example method 200 for translating a device-neutral directive. Method 200 will be described with respect to the components and data of computer architecture 100.

Remaining briefly at FIG. 1, directive dispatcher 101 can dispatch device-neutral directive 111 to target device 107 (as well as one or more other devices). Device-neutral directive 111 can direct target device 107 (as well as the one or more other devices) to implement a configuration change. When appropriate, directive processing modules 102 can apply business logic to device-neutral directive 111. Device-neutral directive 111 is then passed on to distribution component 103 for distribution. Distribution component 103 can determine that device-neutral component has been issued to target device 107. In response, distribution component 103 can forward device-neutral directive 111 to platform-specific gateway 104.

In general, directives can include setting device configuration, collecting device hardware and software inventory, distribution of updates, patches, and applications to a device, issuing "wipe/rest" commands, etc. Device-neutral directive 111 can include any of these (as well as other) directives.

Method 200 includes an act of a platform-specific gateway receiving an abstract device-neutral directive from a distribution component, the abstract device-neutral directive issued by a directive dispatcher, the abstract device-neutral directive directing a specified target device to implement a configuration change (201). For example, platform-specific gateway 104 can receive device-neutral directive 111 from distribution component 103. As described, device-neutral directive 111 was dispatched from directive dispatcher 101 and directs target device 107 to implement a configuration change.

Method 200 includes the platform-specific gateway translating the abstract device-neutral directive into a form suitable for execution at the specified target device to implement the configuration change (202). For example, translation module 106 can translate device-neutral directive 111 into device-specific directive 112. Device-specific directive 112 can be a form suitable for execution at target device 107 to implement the directed configuration change.

Method 200 includes the platform-specific gateway sending the form suitable for execution at the specified target device to the specified target device so as to realize the configuration change at the specified target device (203). For example, platform-specific gateway 104 can send device-specific directive 112 to target device 107.

Target device 107 can execute device-specific directive 112 to implement the directed configuration change.

Figure 3:
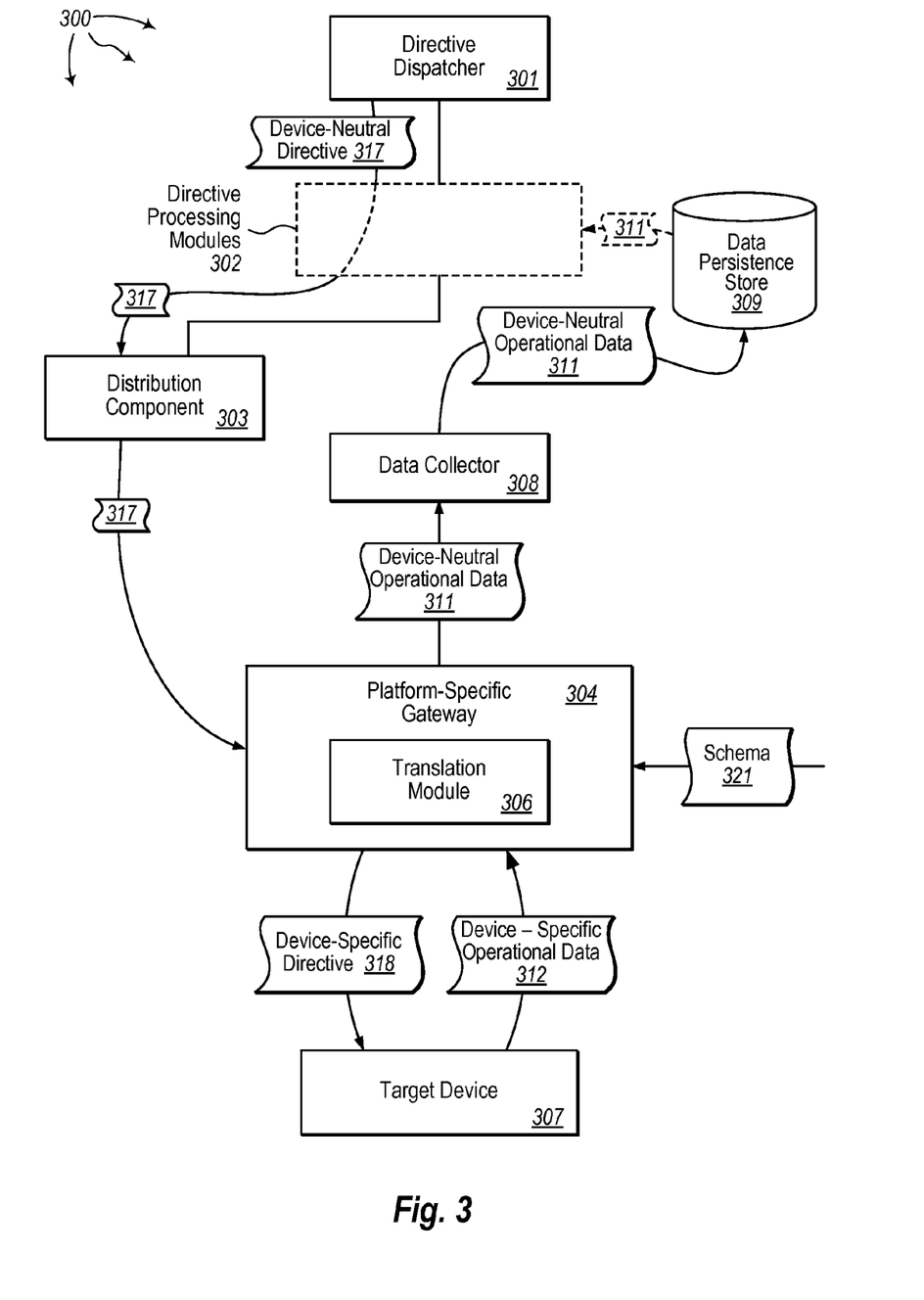
FIG. 3 illustrates an example computer architecture that facilitates translating a device-specific operational data.

FIG. 3 illustrates an example computer architecture 300 that facilitates translating a device-specific operational data. Referring to FIG. 3, computer architecture 300 includes directive dispatcher 301, directive processing modules 302, distribution component 303, platform-specific gateway 304, target device 307, data collector 308, and data persistence store 309. Each of directive dispatcher 301, directive processing modules 302, distribution component 303, platform-specific gateway 304, target device 307, data collector 308, and data persistence store 309 can be connected to one another over (or be part of) a network, such as, for example, a Local Area Network ("LAN"), a Wide Area Network ("WAN"), and even the Internet. Accordingly, directive dispatcher 301, directive processing modules 302, distribution component 303, platform-specific gateway 304, target device 307, data collector 308, and data persistence store 309 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Directive dispatcher 301 can be configured similar to directive dispatcher 101. Directive dispatcher 301 can issue device-neutral directives targeted to one or more specified target devices. The device-neutral directives can direct one or more specified target devices to implement a configuration change. When appropriate, directive processing modules 302 can process issued device-neutral directives to modify the device-neutral directives. Directive processing modules 302 can apply business logic, in combination with operational data stored in data persistence sore 309, to make changes for specified target device or to comply with policy settings. In some embodiments, directive processing modules 302 includes a plurality of modules that can access data from data persistence store 309 and interact with one another to provide various features offered to a user (e.g., an IT admin).

Distribution component 303 is configured similar to distribution component 103. Distribution component 303 can distribute a device-neutral directive to one or more specified targeted devices. Distribution component 303 can receive a device-neutral directive. From the devices distribution component 303 is aware of, distribution component 303 can determine which devices are specified targeted devices of the device-neutral directive. Distribution component 303 can forward to the device-neutral directive on to the specified targeted devices.

Platform-specific gateway 304 is configured to interface between more abstract device-neutral directives issued by directive dispatcher 301 and more concrete device-specific directives for target device 307 (and other similar devices). More specifically, translation module 306 can translate a device-neutral directive into a form suitable for execution at target device 307 (and other similar devices). In some embodiments, platform-specific gateway 304 is one of a plurality of different platform-specific gateways.

Each of the plurality of different platform-specific gateways can be configured to interface between more abstract device-neutral directives issued by directive dispatcher 301 and more concrete device-specific directives for corresponding target devices. Each of the plurality of different platform-specific gateways can also be configured to translate device-specific operational data into device neutral operational data. Each of the plurality of different platform-specific gateways can be configured for use with differently configured devices including any of the previously described devices. For example, platform-specific gateway 304 can be configured for use with mobile phones, another platform-specific gateway can be configured for use with personal computers, another platform-specific gateway can be configured for use with network equipment, etc.

Platform-specific gateway 304 is further configured to collect operational data from target device 307 (and other similar devices). Collected operational data can be in a device-specific data format and can be related to a previously issued directive from directive dispatcher 301.

Platform-specific gateway 304 can interface between the device-specific data format and a device-neutral data format. More specifically, translation module 306 can translate operational data in the device-specific data format into operational data in the device-neutral format. The device-neutral format can be defined in schema 321. Thus, platform-specific gateway 304 (as well as any other platform-specific gateways) can translate operational data in a device-specific data format into operational data in the device-neutral format in accordance with schema 321.

Data collector 308 is configured to collect operational data in the device-neutral format from platform-specific gateway 304 (as well as any other platform-specific gateways). Data collector 308 can store operational data in the device-neutral format in data persistence store 309. Operational data stored in data persistence store 309 can be accessed by directive processing modules 302. Directive processing modules 302 can apply business logic based on stored operational data to access previously issued directives. Thus, output from prior directives can be used as feedback when processing new directives.

Target device 307 can be one of a variety of different devices, such as, for example, a personal computer, a mobile phone, a tablet, network equipment, etc. or other previously described devices.

Figure 4:
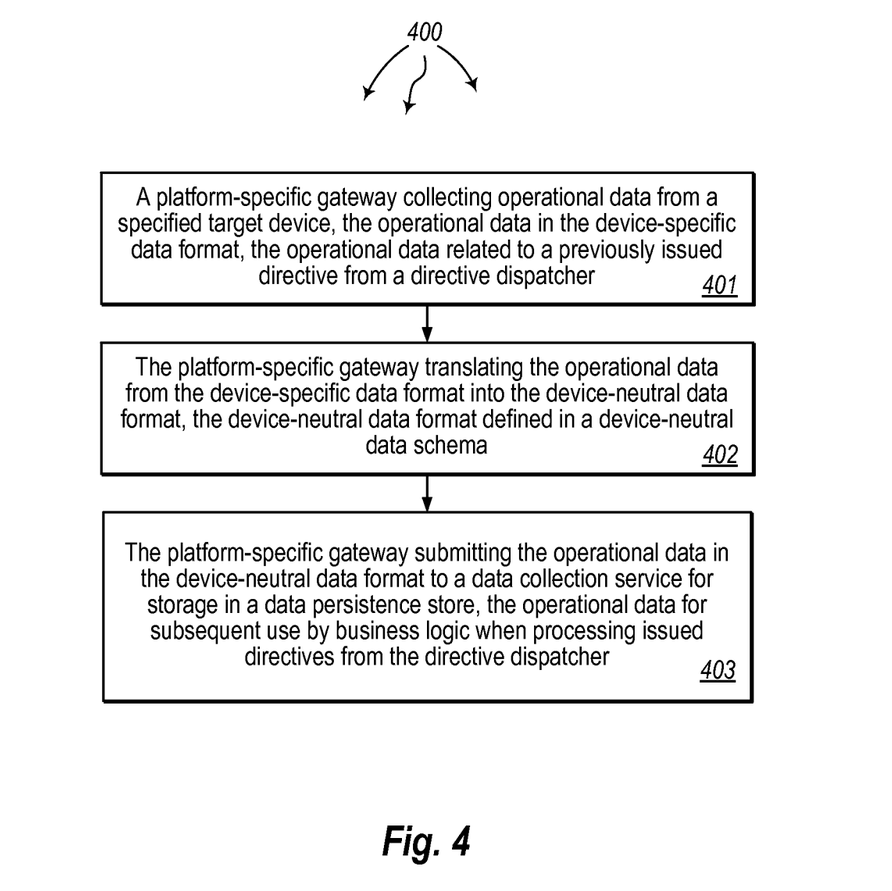
FIG. 4 illustrates a flow chart of an example method for translating device-specific operational data.

FIG. 4 illustrates a flow chart of an example method 400 for translating device-specific operational data. Method 400 will be described with respect to the components and data of computer architecture 300.

Remaining briefly at FIG. 3, directive dispatcher 301 can dispatch device-neutral directive 317 to target device 307 (as well as one or more other devices). Device-neutral directive 317 can direct target device 307 (as well as the one or more other devices) to implement a configuration change. When appropriate, directive processing modules 302 can apply business logic to device-neutral directive 317. Device-neutral directive 317 is then passed on to distribution component 303 for distribution. Distribution component 303 can determine that device-neutral component has been issued to target device 307. In response, distribution component 303 can forward device-neutral directive 317 to platform-specific gateway 304.

Platform-specific gateway 304 can receive device-neutral directive 317 from distribution component 303. Translation module 306 can translate device-neutral directive 317 into device-specific directive 318. Device-specific directive 318 can be a form suitable for execution at target device 307 to implement the directed configuration change. Platform-specific gateway 304 can send device-specific directive 318 to target device 307.

Target device 307 can execute device-specific directive 318 to implement the directed configuration change. As part of execution, target device 307 can emit device-specific operational data 312 related to the directed configuration change.

In general, operational data can include success/failure/details information relevant to the application of management directives supplied from a gateway. Thus, device-specific operational data 312 can include success/failure/details information relevant to the application of device-specific directive 318.

Method 400 includes a platform specific gateway collecting operational data from a specified target device, the operational data in the device-specific data format, the operational data related to a previously issued directive from a directive dispatcher (401). For example, platform-specific gateway 304 can collect device-specific operational data 312. Device-specific operational data 312 can be in a format specific to target device 307 (and other similar devices). Device-specific operational data 312 can be related to device-neutral directive 317.

Method 400 includes the platform specific gateway translating the operational data from the device-specific data format into the device-neutral data format, the device-neutral data format defined in a device-neutral data schema (402). For example, translation module 306 can translate device-specific operational data 312 into device-neutral operational data 311. Device-neutral operational data 311 can be defined in a device-neutral format defined in schema 321.

Method 400 includes the platform-specific gateway submitting the operational data in the device-neutral data format to a data collection service for storage in a data persistence store, the operational data for subsequent use by business logic when processing issued directives from the directive dispatcher (403). For example, platform-specific gateway 304 can submit device-neutral operational data 311 to data collector 308 for storage in data persistence store 309.

Data collector 308 can receive device-neutral operational data 311 from platform-specific gateway 304. Data collector 308 can store device-neutral operational data 311 in data persistence store 309. Device-neutral operational data 311 can then be accessed by directive processing modules 302 when processing directives from directive dispatcher 301.

Figure 5:
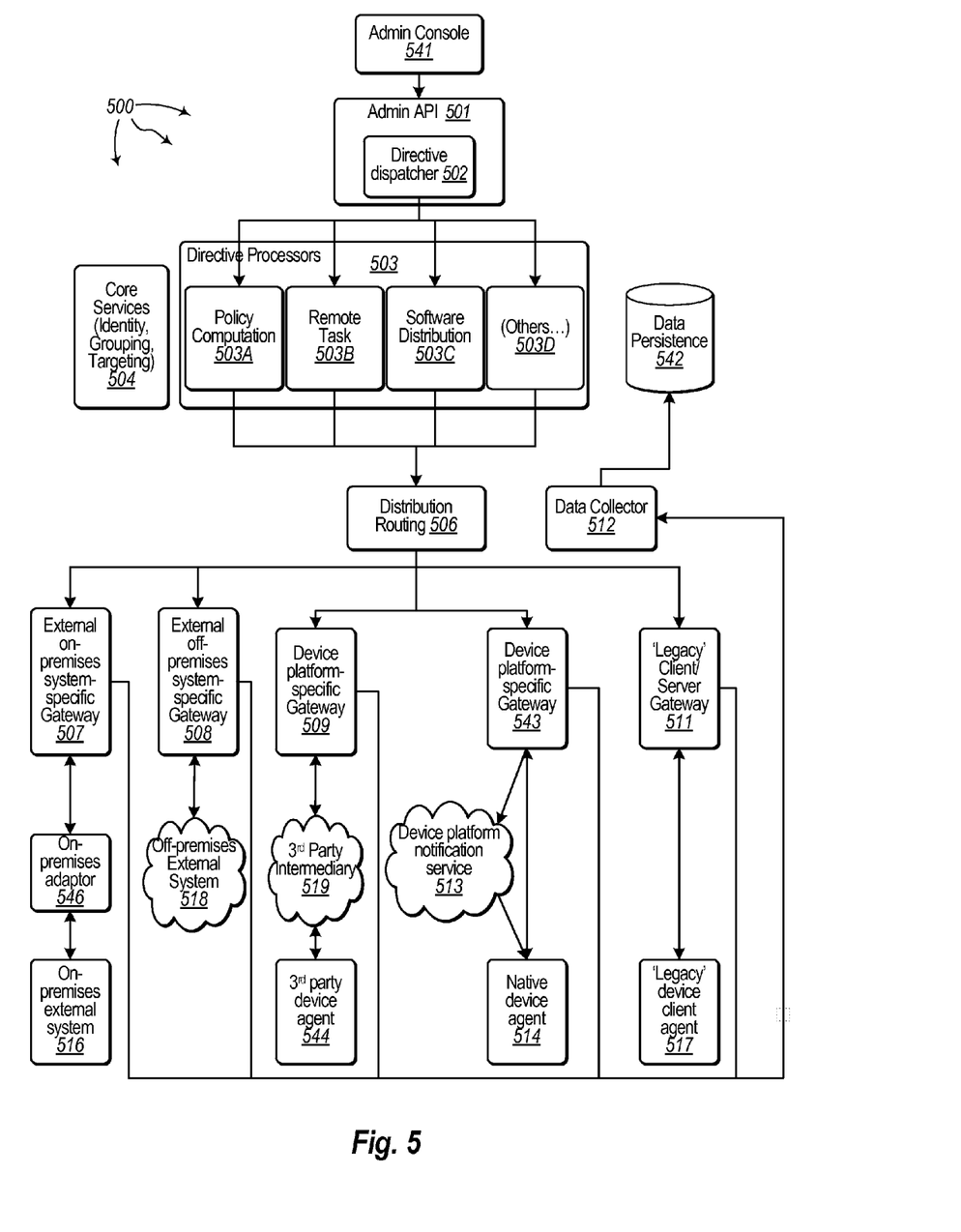
FIG. 5 illustrates an example computer architecture that facilitates managing technology resources across multiple platforms.

FIG. 5 illustrates an example computer architecture 500 that facilitates managing technology resources across multiple platforms.

Referring to FIG. 5, an admin user of computer architecture 500 can utilize administrator console software program 541. Software program 541 can be a Web browser application, software installed on a computer system, or an application ("app") installed on a tablet or smart phone. The admin user can supply "directives" to via admin console 541. "Directives" can be commands, scripts, software packages, configuration manifests, configuration policies, software licensing keys, workflows, user and hardware catalogs, and other such inputs that the admin desires to implement over a population of devices and external systems.

Application Programming Interface ("API") 501 can accept the directives from admin console 541. API 501 can be a standards-compliant Internet protocol following Simple Object Access Protocol ("SOAP") or Representational State Transfer ("REST") patterns. Alternatively, API 501 can be a body of industry standard or proprietary Remote Procedure Call ("RPC") technologies.

API 501 can use directive dispatcher 502 to dispatch device-neutral directives to one or more directive processors 503. Directive processors can be included for any number of features. As depicted, directive processors 503 include policy computation 503A, remote tasks 503B, software distribution 503C, and others 503D. Core services 504 include identification of users and devices, the organization of users and devices into groups for administrative convenience, and the binding of directives to groups of users and/or devices. Any of directive processors 503 can utilize the functionality of core services 504.

When new features are desired, new processors can be added to implement the desired features. For example, to add a device backup feature, a directive processor used to back up devices can be added.

Data persistence store 542 can store data for use by directive processors 503. Data collector 512 can collect data from and about entities that are being managed. Data collector 512 can store the data in data persistence store 542. Data persistence store 542 can take the form of a single database server, a cluster of database servers, or a scale cloud storage device. In some embodiments, a directive processor can also implement its own data persistence.

Directive processors can 503 apply business logic to device-neutral directives received from directive dispatcher 502, in combination with data from data persistence store

542, and other external data. For example, directive processors 503 can tabulate the results of prior directives used, analyze directives for correctness and consistency with existing standing directives, speculatively predict the impact of implementing a directive (i.e., impact analysis), determine historical trends and other data mining operations, package data payloads for subsequent distribution, and so on. Processing device-neutral directives can result in additional data being fed back into the system (e.g. analysis results saved at data persistence store 542) or feedback (e.g. reports generated for user inspection) being provide to the users (e.g., an IT admin). Processing device-neutral directives can also result in data related to the implementation of directives being distributed to managed external devices and systems (e.g., any of on-premises external system 516, off-premises external system 518, $3^{rd}$ party device agent 544, native device agent 514, or legacy device client agent 517).

For example, an IT admin may issue a directive to install a software package on all computers in the Sales department. Software distribution processor 503C can analyze this device-neutral directive to determine the suitability and compatibility of known computers in the Sales group, analyze the usage of available licenses against needed licenses, and so forth. A separate external actor (e.g., an agent running on each of the target devices) can then perform the installation steps on each of the appropriate devices.

As such, since directive processors 503 process device-neutral directives, directive processors 503 are able to accomplish their processing without having to understand the specific details of the various devices and/or external systems that are targets of management. Gateway adaptors (e.g., 507, 508, 509, 543, and 511) provide translation of device-neutral directives into a form suitable for execution in specified target devices. Each gateway adaptor can be responsible for translating the abstract, device-neutral (or external system-neutral) directives into concrete, device-specific (or external system-specific) forms suitable for execution on specific targeted devices (or external systems).

Distribution routing component 506 can route device-neutral directives to the appropriate gateway. Distribution routing component 506 can use information recorded about each device/external system in the data persistence store 542 to facilitate routing device-neutral directives.

Various different types of gateway adaptors can be used. The architecture is also generalized such that new gateway adaptors can easily be added.

Device platform-specific gateway 543 can used to adapt device-neutral directives to those of a specific device platform. Device platform-specific gateway 543 is responsible for implementing the "server/service" portion of the management protocol used by native device agent 514 for the target device platform. That is, device platform-specific gateway 543 can translate a device-neutral directive into the "server/service" portion of the management protocol used by native device agent 514.

For example, a device platform may be a mobile phone or table operating system. The platform manufacturer can configure the device platform as a closed system. The platform manufacturer can also include its own management agent, which it does not allow other parties to modify. The platform manufacturer can also develop an accompanying management protocol to interact with the management agent. In these embodiments, device platform-specific gateway 543 adapts a device-neutral directive to the accompanying management protocol. As such, an IT admin can enter a generic directive at admin console 541 to control a device that uses an otherwise closed and/or propriety management protocol.

For some device platforms and device client agent protocols, device platform notification service 513 can be used. For such platforms and protocols, device platform-specific gateway 543 can utilize that notification service. Continuing with the prior example, the platform manufacturer can provide device platform notification service 513.

The interaction between the device platform-specific gateway 543, device platform notification service 513, and native device agent 514 is bi-directional. That is, information can be collected and distributed between these components.

These and other patterns can be essentially repeated for other managed devices. The patter can also be used for device platforms from the same vender. That is, a management system may include its own device client agent. In that event, the translation performed by a gateway adaptor can be significantly reduced.

Gateway adaptors can also be used for managing prior (or legacy) editions of device clients. For example, legacy client/server gateway 511 can be used to adapt a device-neutral directive to the accompanying management protocol used by legacy device client agent 517. Legacy client/server gateway 511 can also adapt the directives expressed in one version of an IT management system to those of a previous version of the same system. Adaption to previous versions can be useful when a legacy agent is designed to work with a prior version of a now revised system. Adaption to previous versions can be a way to include continuity of management of devices not yet upgraded or not able to be upgraded to the client agent corresponding to the revised system.

Legacy client/server gateway 511 can also provide interoperability with a device client agent of a different (perhaps competing) management system product. In this scenario, the Legacy client/server gateway 511 can emulate the server portion of the competing management system, from the perspective of the device client agent.

The interaction between legacy client/server gateway 511 and legacy device client agent 517 is bi-directional. That is, information can be collected and distributed between these components.

External on-premises system-specific gateway 507 and on-premises adaptor 546 can be used to adapt device-neutral directives for use with an external software system that is installed on the premises of an enterprise, such as, for example, on-premise external system 516. For example, it may be that an IT admin wishes to manage the email mailboxes of the users in the enterprise. However, the email mailboxes are part of an email system not part of an IT management system. The email system can include one or more servers present on the premises of the owning and/or operating enterprise.

Either the IT management system or the email system can supply on-premises adaptor 546 to be run on-premises with the email system. On-premise adaptor 546 accepts data and commands from the external on-premises system-specific gateway 507 and enacts those commands on on-premises external system 516. Alternately, on-premises external system may itself provide facilities that external on-premises system-specific gateway 507 can utilize directly. In this embodiment, on-premises adaptor 546 may not be included. The interaction between the components external on-premises system-specific gateway 507, on-premises adaptor 546 and on-premises external system 516 is bi-directional. That is, information can be collected and distributed between these components.

The pattern is applicable to any number of other external systems, including document management, customer relationship management (CRM), complimentary IT management systems, etc.

External off-premises system-specific gateway 508 can be used to adapt device-neutral directives for use with an external software system that is installed off the premises of an enterprise, such as, for example, off-premise external system 518. External off-premises system-specific gateway 508 can use service interfaces exposed by off-premises external system 518 to implement directives and collect information. Off-premises external system 518 can include services such as Office 365, Google Apps, Salesforce, Dynamics Online, etc.

The interaction between External off-premises system-specific gateway 508 and off-premises external system 518 is bi-directional. That is, information can be collected and distributed between these components.

Device platform-specific gateway 509 and $3^{rd}$ party intermediary 519 can be used to adapt device-neutral directives to bridge use between an IT management system and systems/devices operated by a third party, such as, $3^{rd}$ party device agent 544. Here, device platform-specific gateway 509 communicates with $3^{rd}$ party intermediary 519 that utilizes $3^{rd}$ party device agent 544 also supplied by the external $3^{rd}$ party system. That is, $3^{rd}$ party intermediary 519 handles communication with $3^{rd}$ party device agent 544. Device platform-specific gateway 509 directs the external system utilizing interfaces provided by the external system.

The interaction between the Device platform-specific gateway 509, $3^{rd}$ party intermediary 519, and $3^{rd}$ party device agent 544 is bi-directional. That is, information can be collected and distributed between these components.

Gateway adaptors can also collect data from managed devices and external systems. The gateway adaptors can translate collected data into a device-neutral format. The gateway adaptors can submit collected data in the device-neutral format to data collector 512. Data collector 512 can define device- and external system-neutral data schema. Gateway adaptors can use the schema to formulate collected data into the device-neutral format.

Data collector 512 can receive collected data (in the device-neutral format) from gateway adaptors. Data collector 512 can apply further processing when appropriate. Data collector 512 can then store collected data in data persistence store 542. Directive processors 503 can refer to the collected data when processing subsequent directives from directive dispatcher 502.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computer system including one or more processors, system memory, and a platform-specific gateway, the platform-specific gateway situated between a directive dispatcher and a specific targeted device, a method for managing technology resources at the specified target device, the method comprising:

the platform-specific gateway receiving a device-neutral configuration directive routed from a distribution component to the platform-specific gateway via network communication based on the device-neutral configuration directive being directed to the specified target device, the device-neutral configuration directive issued by a directive dispatcher to the distribution component via network communication, the device-neutral configuration directive directing the specified target device to implement a configuration change defined in the device-neutral configuration directive, the device-neutral configuration directive having been modified by one or more directive processors based on operational data collected from one or more other target devices that previously attempted to implement the device-neutral configuration directive, the operational data providing feedback for use in modifying the device-neutral configuration for the specified target device;

the platform-specific gateway translating the device-neutral directive into a device-specific configuration directive for the specified target device based on the feedback, the device-specific configuration directive of a form suitable for execution at the specified target device to implement the defined configuration change; and the platform-specific gateway sending the device-specific configuration directive to the specified target device so as to realize the defined configuration change at the specified target device.

2. The method of claim 1, wherein the platform-specific gateway translating the device-neutral configuration directive into a form suitable for execution at the specified target device comprises the platform-specific gateway translating the device-neutral configuration directive into a form suitable for execution by a native device agent.

3. The method of claim 1, wherein the platform-specific gateway translating the device-neutral configuration directive into a form suitable for execution at the specified target device comprises legacy gateway translating the device-neutral configuration directive into a form suitable for execution by a legacy device agent.

4. The method of claim 1, wherein the platform-specific gateway translating the device-neutral configuration directive into a form suitable for execution at the specified target device comprises the platform-specific gateway translating the device-neutral configuration directive into a form suitable for execution by a $3^{rd}$ party intermediary, the $3^{rd}$ party intermediary in communication with a $3^{rd}$ party device agent.

5. The method of claim 1, wherein the platform-specific gateway translating the device-neutral configuration directive into a form suitable for execution at the specified target device comprises an external off-premises system-specific gateway translating the device-neutral configuration directive into a form suitable for execution by an off-premises external system.

6. The method of claim 1, wherein the platform-specific gateway translating the device-neutral configuration directive into a form suitable for execution at the specified target device comprises an external on-premises system-specific gateway translating the device-neutral configuration directive into a form suitable for execution by an on-premises adaptor, the on-premises adaptor in communication with an on-premises external system.

7. The method of claim 1, wherein receiving a device-neutral configuration directive from a distribution component comprises receiving a device-neutral configuration directive, the device-neutral configuration directive having been modified by the one or more directive processors subsequent to issuance of the device-neutral configuration directive from the directive dispatcher.

8. The method of claim 7, wherein receiving a device-neutral configuration directive from a distribution component comprises receiving a device-neutral configuration directive from a distribution component wherein the one or more directive processors have performed one or more of: tabulating results, analyzing the device-neutral configuration directive, predicting the impact of implementing the device-neutral configuration directive, and determining an historical trend with respect to the device-neutral configuration directive.

9. At a computer system, the computer system including one or more processors, system memory, and a platform-specific gateway, the platform-specific gateway situated between a directive dispatcher and a specific targeted device, a method for managing technology resources at the specified target device, the method comprising:

the platform-specific gateway collecting operational data via network communication from the specified target device, the operational data in the device-specific data format, the operational data responsive to a device-specific configuration directive issued via network communication from the platform-specific gateway to the specified target device, the operational data providing details related to the success or failure of implementing the device-specific configuration directive at the specified target device, the platform-specific gateway having translated a device-neutral configuration directive into the device-specific configuration directive, the device-neutral configuration directive issued from the directive dispatcher and routed from a network distribution component to the platform-specific gateway;

the platform-specific gateway translating the operational data from the device-specific data format into a device-neutral data format; and the platform-specific gateway submitting the operational data in the device-neutral data format to a uniform data collection service via network communication, the operation data for storage in a data persistence store along with operational data collected in response to other issued device-specified configuration directives, the operational data providing feedback for use by business logic to modify subsequent device-neutral configuration directives from the directive dispatcher prior to issuance to other targeted devices.

10. The method of claim 9, wherein the platform-specific gateway translating the operational data from the device-specific data format into the device-neutral data format comprises a legacy client/server gateway translating operational data from a legacy device client agent into the device-neutral data format.

11. The method of claim 9, wherein the platform-specific gateway translating the operational data from the device-specific data format into the device-neutral data format comprises an external system-specific gateway translating operational data from an external system into the device-neutral data format.

12. The method of claim 9, wherein the platform-specific gateway translating the operational data from the device-specific data format into the device-neutral data format comprises a platform-specific gateway translating the operational data from the device-specific data format into the device-neutral data format in accordance with a device-neutral data schema defined by a data collector.

13. A technology resources management system, the technology resources management system comprising service-side components, a plurality of platform-specific gateways, and a plurality of specified targeted devices, the service-side components, including:
    one or more processors;
    system memory;
    a data persistence store, the data persistence store storing operational data collected from one or more of the plurality of specified targeted devices; and
    one or more computer storage media having stored thereon computer-executable instructions representing a directive dispatcher, one or more directive processors, a data collector, and a distribution router, (i) the directive dispatcher configured to:
        receive directives via an administrative console, the directives for implementing a configuration change at one or more of the plurality of specified target devices;
        dispatch the directives as device-neutral configuration directives to at least one of the one or more directive processors, the device-neutral configuration directives in a device-neutral format;
    (ii) each of the one or more directive processors configured to:
        receive device-neutral configuration directives from the directive dispatcher;
        access operational data from the data persistence store, the operational data providing feedback relevant to the attempted installation of previously issued device-neutral configuration directives at targeted devices;
        apply business logic to modify the received device-neutral configuration directive based on the feedback into a modified device-neutral configuration directive for execution at the one or more of the plurality of specified targeted devices; and
        forward the modified device-neutral configuration directive to the distribution router;
    (iii) the data collector configured to:
        receive operational data submitted from platform-specific gateways in a device-neutral data format; and
        store the operational data in the data persistence store in the device-neutral format as feedback providing details related to the success or failure of implementing a device-specific configuration directive at a targeted device;
    (iv) the distribution router configured to:
        receive device-neutral configuration directives from the one or more directive processors;
        identify the appropriate platform-specific gateways, from among the plurality of platform-specific gateways, that are to receive the device-neutral configuration directives, the appropriate platform-specific gateways identified based on the one or more of the plurality of specified target devices that are to implement the configuration change; and
        forwarding the device-neutral configuration directives to the identified appropriate platform-specific gateways;

each of the plurality of platform-specific gateways configured to interface between the service-side components and a corresponding specified target device, including processing device-neutral configuration directives issued from the directive dispatcher and processing operational data from a specified target device:

processing device-neutral configuration directives including:
  receive a device-neutral configuration directive from the distribution router;
  translate the device-neutral configuration directive into device-specific configuration directive of a form suitable for execution at the specified target device to implement the configuration change; and
  send the device-specific configuration directive for execution at the specified target device to the specified target device so as to realize the configuration change at the specified target device;
processing operational data including:
  collect operational data from the specified target device, the operational data in a device-specific data format, the operational data related to the success or failure of implementing a device-neutral configuration directive issued from the directive dispatcher;
  translate the operational data from the device-specific data format into the device-neutral data format; and
  submit the operational data in the device-neutral data format to the uniform data collection service for storage in a data persistence store; and
each of the plurality of specified targeted devices configured to:
  receive a device-specific configuration from a corresponding platform-specific gateway;
  execute the device-specific configuration directive to realize the configuration change; and
  return operation data related to the success or failure of implementing the configuration change to the corresponding platform-specific gateway in the device-specific data format.

14. The system of claim 13, wherein one or more directive processors include one or more of: a policy computation directive processor, a remote task directive processor, a software distribution directive processor, and a backup directive processor.

15. The system of claim 13, wherein one or more directive processors include core services that is available to other directive processors.

16. The system of claim 13, wherein the data collector is further configured to define a data schema for device-neutral data format.

17. The system of claim 13, wherein the plurality of platform-specific gateways includes one or more of: a legacy client/server gateway and an external system-specific gateway.

18. The system of claim 13, wherein each of the one or more directive processors being configured to apply business logic to modify the received device-neutral configuration directive comprises at least one directive processor being configured to apply business logic to modify the received device-neutral configuration directive a prior implementation of the received device-neutral configuration directive.

19. The system of claim 13, wherein each of the one or more directive processors being configured to apply business logic to modify the received device-neutral configuration directive comprises at least one directive processor being configured to apply business logic to modify the received device-neutral configuration, includes performing one or more of: tabulating results, analyzing the device-neutral configuration directive, predicting the impact of implementing the device-neutral configuration directive, and determining an historical trend with respect to the device-neutral configuration directive, to determine how to modify the device-neutral configuration directive.

20. The system of claim 13, wherein each of the plurality of platform-specific gateways being configured to interface between the service-side components and a corresponding specified target device comprises at least one platform-specific gateway being configured to interface service-side components and a manufacturer proprietary management protocol.

* * * * *